(12) United States Patent
Ouchi

(10) Patent No.: US 6,829,398 B2
(45) Date of Patent: Dec. 7, 2004

(54) OPTICAL WAVEGUIDE APPARATUS

(75) Inventor: Toshihiko Ouchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 10/212,159

(22) Filed: Aug. 6, 2002

(65) Prior Publication Data

US 2003/0039455 A1 Feb. 27, 2003

(30) Foreign Application Priority Data

Aug. 21, 2001 (JP) ........................................ 2001-249698
Feb. 5, 2002 (JP) ........................................ 2002-027585

(51) Int. Cl.$^7$ ............................. G02B 6/12; G02B 6/10
(52) U.S. Cl. ......................... 385/14; 385/129; 385/130
(58) Field of Search ................................. 385/129–132

(56) References Cited

U.S. PATENT DOCUMENTS

| | | | | |
|---|---|---|---|---|
| 3,777,154 A | * | 12/1973 | Lindsey | 250/227.11 |
| 4,151,582 A | * | 4/1979 | Grunberger | 362/31 |
| 5,191,219 A | | 3/1993 | Linke | 250/551 |
| 6,408,121 B1 | * | 6/2002 | Goto | 385/129 |
| 6,455,878 B1 | * | 9/2002 | Bhat et al. | 257/99 |
| 2002/0109074 A1 | | 8/2002 | Uchida | 250/214.1 |
| 2002/0167013 A1 | | 11/2002 | Iwasaki et al. | 257/79 |
| 2003/0152354 A1 | | 8/2003 | Uchida | 385/129 |
| 2003/0179979 A1 | | 9/2003 | Ouchi | 385/14 |
| 2004/0114854 A1 | | 6/2004 | Ouchi | 385/14 |

FOREIGN PATENT DOCUMENTS

| JP | 9-270751 | 10/1997 |
|---|---|---|
| JP | 2000-235127 | 8/2000 |

OTHER PUBLICATIONS

L. Balliet et al., "Optical Transmission for Interconnecting Electronics Units," *IBM Technical Disclosure Bulletin*, vol. 26, No. 4, Sep. 1983, pp. 1793–1796.

* cited by examiner

*Primary Examiner*—Akm Enayet Ullah
*Assistant Examiner*—Tina Lin
(74) *Attorney, Agent, or Firm*—Fitzpatrick, Cella, Harper & Scinto

(57) ABSTRACT

The optical waveguide apparatus includes an optical waveguide sheet, and an optical device integrated with an optical-path converting unit. The optical sheet can include a guide unit for setting the optical device therein.

6 Claims, 19 Drawing Sheets

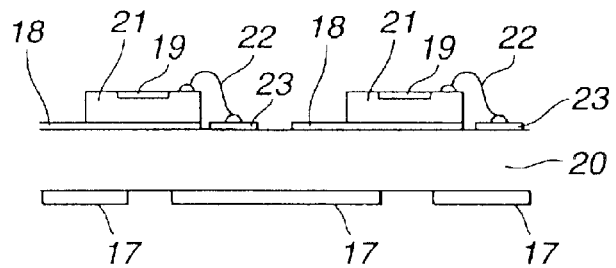
FIG.3A
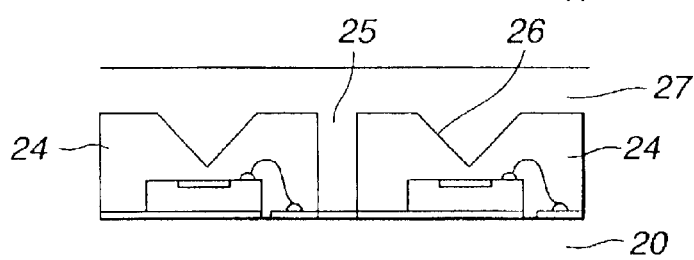
FIG.3B
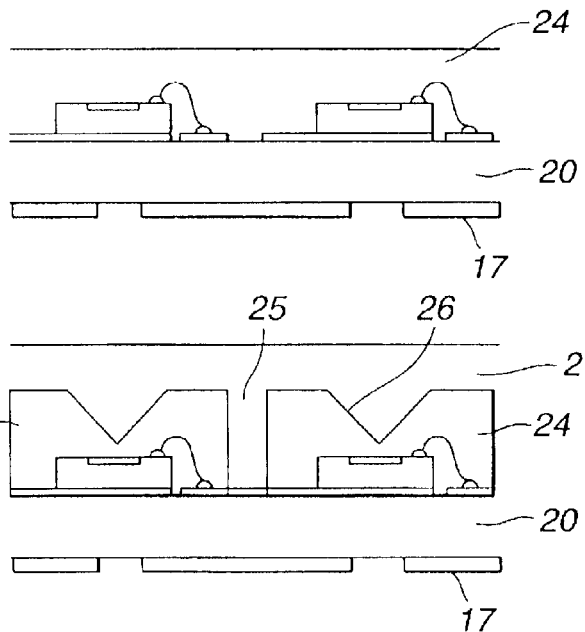
FIG.3C
FIG.3D
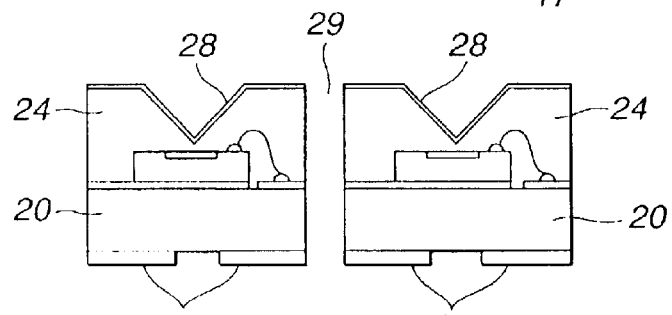
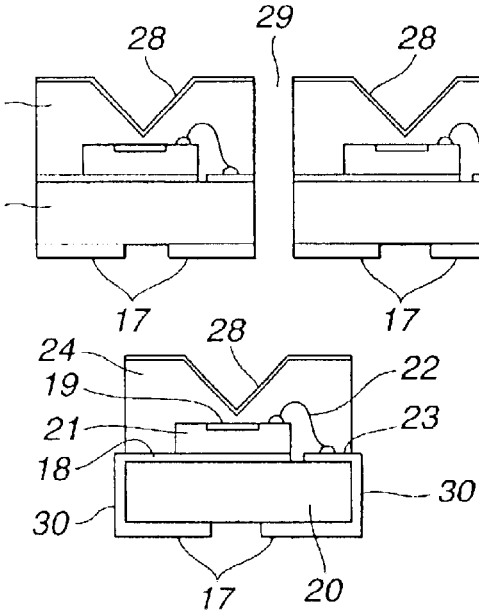
FIG.3E

OPTICAL WAVEGUIDE APPARATUS

BACKGROUND OF THE INVENTION

1. Field of the Invention

The present invention relates to an optical waveguide apparatus that includes an optical waveguide sheet and an optical device. In this specification, an optical waveguide sheet or optical sheet is a waveguide which permits light transmission form a light transmitting unit toward a direction different from a direction oriented from the light transmitting unit to a light receiving unit, as well as light transmission form the light transmitting unit to the light receiving unit, for example.

2. Description of the Related Background Art

In recent years, performances of portable apparatuses, such as personal computers, cellular phones and personal digital assistants (PDAs), and digital audio-visual apparatuses have been increasingly improved, and their interconnections are being developed using all kinds of frequency bands in both of wireless and wire forms. Therefore, appropriate prompt measures are needed to cope with malfunctions of digital equipment due to electromagnetic interference from electric substrates (electromagnetic interference: EMI), immunity from intervention of external electric waves (immunity), and signal errors resulting from defective connections (signal integrity (SI)). With those electromagnetic-wave problems, products prior to shipment are required to clear regulation magnitudes prescribed in the electric-wave regulation law, and development costs for taking those measures continuously increase. In this situation, the optical wiring without any electromagnetic induction is expected to radically solve the above bottleneck.

Further, in the near future the high-speed interconnect environment will be surely established also in homes, so that there is a need to prevent the malfunction and noise intervention even when high-speed electronic equipment is freely connected in a variety of ground environments. Also in this respect, the optical interconnection is an effective means that can readily achieve an electric isolation from the ground.

Various methods of the optical wiring interconnection have been proposed. FIG. 1 illustrates an optical wiring structure 1100 disclosed in Japanese Patent Application Laid-Open No. 9(1997)-270751. In FIG. 1, reference numeral 1120 designates an electric circuit board. Reference numeral 1130 designates an emitting end of optical signals S1, S2 and S3. Reference numeral 1133 designates an optical-signal input portion. Reference numeral 1101 designates an optical bus. Reference numeral 1134 designates an optical-signal output portion. Reference numeral 1140 designates a receiving end of optical signals S1, S2 and S3. Optical devices 1132 and 1142 driven by driver circuits 1131 and 1141 are mounted at the output and input ports 1130 and 1140, respectively. The optical device 1132 is optically coupled to the waveguide sheet 1101 through a 45-degree mirror (optical-path converting unit) 1133s.

In the structure of FIG. 1, the positioning or alignment between the optical device 1132 and the optical bus (waveguide sheet) 1101, more specifically, between the optical device 1132 and the mirror 1133s, is critically important when light from the optical device 1132 is to be coupled to the optical bus 1101.

SUMMARY OF THE INVENTION

It is an object of the present invention to provide an optical waveguide apparatus that facilitates the alignment between an optical device and an optical path converting unit, an optical device, and an opto-electric mixture wiring substrate.

According to one aspect of the present invention, there is provided an optical waveguide apparatus that includes an optical waveguide sheet, and an optical device integrated with an optical-path converting unit. The optical sheet can include a guide unit for setting the optical device therein.

According to another aspect of the present invention, there is provided an optical waveguide apparatus that includes an optical waveguide sheet, an optical device, and a guide unit for setting the optical device therein, which is formed on the optical sheet or a layer on the optical sheet. An optical-path converting unit can be provided at a place in the optical sheet immediately below the guide unit.

According to another aspect of the present invention, there is provided an optical device that is a surface optical device integrated with an optical-path converting unit, which is to be mounted on an optical waveguide sheet. The surface optical device is a surface optical device in a broad sense which includes an end emitting semiconductor laser connected to a 45-degree mirror that can emit light perpendicularly to a substrate, as well as a vertical cavity surface emitting laser (VCSEL) and a surface photodiode. The optical-path converting unit changes a propagation direction of light emitted from the optical device from a direction perpendicular to the optical sheet to a direction parallel to the optical sheet, or changes a propagation direction of light directed to the optical device from a direction parallel to the optical sheet to a direction perpendicular to the optical sheet.

The above optical device is integrated with the optical-path converting unit, such as a conical mirror, a semispherical mirror, and a prism. The prism has a reflective and refractive surface, while the mirror has a reflective surface. With such an optical device, no special means needs to be formed in the optical waveguide sheet on which the optical device is to be mounted. The optical device with the optical-path converting unit can be set at a desired location of the optical sheet at which a guide hole or the like is formed, so that the optical device can be positioned at a location corresponding to an appropriate electrode pad formed on the electric circuit board.

Therefore, the above optical device is more advantageous than the case where a mirror or the like is formed in the optical waveguide sheet in the following point. There is no need to align the optical device with the mirror when the optical device is mounted on the optical sheet, and no special processing of the optical sheet is needed. Thus, an optical waveguide apparatus for the optical wiring can be achieved with excellent productivity.

When a two-dimensional slab waveguide is used as the optical sheet, the conical mirror enables signal transmission and receiving to be performed in all directions parallel to the slab waveguide. When the 45-degree mirror is also used, signal transmission and receiving along a desired direction can be executed together with the signal transmission and receiving in all directions. Where one two dimensional slab waveguide is used, signal multiplexing will be basically performed using the time division sharing, i.e., parallel-serial conversion. However, when a line waveguide (a linear waveguide) is formed in the two-dimensional slab waveguide, parallel transmission with independent channels can be employed for necessary lines as well.

More specifically, the following specific constructions are possible. The optical device can be mounted on a mounting substrate, and the optical-path converting unit can be formed of a polymer. Alternatively, the optical device can be in a bare-chip form, and the optical-path converting unit can be formed of a polymer.

The optical-path converting unit can be a device that coverts the optical path by its reflecting action. In this case, the optical-path converting unit can include a conical reflective surface an apex of which is directed toward the center of a functional portion of the optical device, such as a surface emitting device, such that light from the optical device can be reflected in all directions around the apex and distributed over 360 degrees about the apex. The optical-path converting unit also can include a conical reflective surface an apex of which is directed toward the center of a functional portion of the optical device, such as a surface light-receiving device, such that light travelling from all directions around the apex can be reflected toward the optical device and received thereby. Further, the optical-path converting unit can include a semispherical reflective surface that has substantially the same function as that of the conical reflective surface, or can include a multi-sided pyramid reflective surface that has about the same function as that of the conical reflective surface. Furthermore, the optical path converting unit can include a 45 degree mirror that reflects light from the optical device toward a predetermined direction in the optical sheet, or that reflects light from a predetermined direction in the optical sheet toward the optical device to be received thereby. In addition, the optical-path converting unit can principally receive signal light from a predetermined direction, or principally transmit signal light toward a predetermined direction.

The optical-path converting unit also can be an element, such as a prism and a half-mirror, that achieves the optical-path conversion by its function of reflection and refraction. In this case, the optical path converting unit can include a conical reflective and refractive surface an apex of which is directed toward a direction opposite to the center of a functional portion of the optical device, such as a surface emitting device, such that light from the optical device can be reflected and refracted in all directions around the apex and distributed over 360 degrees about the apex. The optical-path converting unit also can include a conical reflective and refractive surface an apex of which is directed toward a direction opposite to the center of a functional portion of the optical device, such as a surface light-receiving device, such that light travelling from all directions around the apex in the optical sheet can be reflected and refracted toward the optical device and received thereby.

Where the optical device is a surface emitting device, the device can be a surface light emitting diode (LED), or a vertical cavity surface emitting laser (VCSEL), for example. Where the optical device is a surface light-receiving device, the device can be a surface photodiode, for example.

Typically, both opposite electrodes of the optical device are drawn out on a side of the substrate surface of the optical device opposite to a side on which the optical-path converting unit is integrated. Thereby, the optical device can be readily set at a location of the optical sheet corresponding to appropriate electrode pads on the electric circuit board.

According to yet another aspect of the present invention, there is provided an optical waveguide apparatus that includes an optical waveguide sheet of a two-dimensional slab waveguide, and the above-discussed optical device integrated with an optical-path converting unit. The optical device is mounted on the optical sheet by embedding the optical-path converting unit in the optical sheet. The optical device is optically coupled to the optical sheet through the optical-path converting unit such that light transmission and receiving of an optical signal can be achieved in the optical sheet.

The above apparatus is more advantageous than a case where a mirror or the like is formed in the optical waveguide sheet in the following point. There is no need to align the optical device with the mirror when the optical device is set on the optical sheet, and no special processing is needed in the optical sheet. Thus, an optical waveguide apparatus for the optical wiring can be achieved with excellent productivity.

Further, since the two-dimensional slab waveguide is used as the optical sheet, signal transmission and receiving can be performed in all directions parallel to the slab waveguide when the conical mirror or the like is used as the optical-path converting unit of the optical device. When the optical device with the 45-degree mirror is used together with the optical device with the conical mirror or the like, signal transmission and receiving along a desired direction can be performed as well as the signal transmission and receiving in all directions. Where one two-dimensional slab waveguide is used, signal multiplexing will be basically performed using the time division sharing, i.e., parallel-serial conversion. However, when the line waveguide is formed in the two-dimensional slab waveguide, or a plurality of two dimensional slab waveguides are layered, parallel transmission with independent channels can also be employed for necessary lines.

When electric wires are further formed on the optical sheet and the optical sheet has a bendable flexible structure, a portion of the electric wiring in an electric board with large scale integration (LSI) and the like mounted thereon can be replaced by the optical wiring of the optical waveguide apparatus of the present invention. Accordingly, the problem of EMI can be solved at relatively low costs without any extensive design alteration.

According to yet another aspect of the present invention, there is provided a two-dimensional optical waveguide sheet which is to be used in the above optical waveguide apparatus and which includes a line waveguide for performing optical transmission and receiving along a predetermined channel independent of other optical transmission and receiving, or a two-dimensional optical waveguide sheet which is to be used in the above optical waveguide apparatus and which includes a metal pattern for the electric wiring formed thereon.

According to yet another aspect of the present invention, there is provided an opto-electric mixture wiring substrate in which the above optical device integrated with the optical-path converting unit is mounted on and electrically connected to an electric circuit board such that the electric wiring in the electric circuit can be at least partly replaced by the optical wiring of the optical waveguide apparatus to operate an electronic apparatus thereby. Accordingly, a portion of the wiring in an electric board with LSI and the like mounted thereon can be executed by the optical waveguide apparatus of the present invention, and an opto electric mixture wiring substrate can be hence constructed. Thereby, the problem of EMI can be solved at relatively low costs without any extensive design alteration of the electric board.

In the above opto-electric mixture wiring substrate, the optical device can be set on an LSI package of the electric circuit board. Further, the optical waveguide apparatus can be flexible such that it can be approximately tightly mounted on an uneven surface of the electric circuit substrate with passive components and LSI mounted thereon.

According to yet another aspect of the present invention, there is provided a method of fabricating the optical device of the present invention in which the outer profile of the optical path converting unit is formed by heating a flatly shaped polymer to a temperature near its glass-transition temperature and pressing an appropriately-shaped mold against the heated polymer.

More specifically, a transparent polymer or the like is put on a surface of the surface light-emitting or light-receiving device, and the polymer is shaped into the above-discussed mirror configuration. Where individual devices are separated by dicing after those structures are collectively formed in a two dimensional array on a wafer, the optical devices with the optical path converting unit can be mass-produced.

According to yet another aspect of the present invention, there is provided a method of fabricating the optical waveguide apparatus of the present invention in which the outer profile of each optical path converting unit is differently formed according its purpose, a hole corresponding to the outer profile of the optical path converting unit integrated with a desired optical device is formed, and each optical device is self-selectively set in the optical waveguide sheet, or a method of fabricating the optical waveguide apparatus of the present invention in which the optical waveguide sheet is heated to a temperature near its glass-transition temperature, and the optical device integrated with the optical-path converting unit is pushed into a desired location of the heated optical sheet and mounted thereat. When the optical device is self-selectively mounted as discussed above, efficiency of the fabrication process can be raised.

According to yet another aspect of the present invention, there is provided an optical waveguide apparatus that includes an optical waveguide sheet for transmission and receiving of an optical signal, in which there is arranged a guide unit for guiding and fixing an optical device or an electric device in a desired manner such that an electric circuit or an opto-electric circuit can be built on the optical sheet. In the optical waveguide apparatus, an alignment process of the optical device can be omitted since there is arranged a guide hole for mounting the optical device such that it can be optically coupled to the optical sheet through the optical-path converting unit such as a semispherical mirror, a 45 degree mirror, a prism, and a grating, for example. An electric wiring for driving the optical device can be formed in the guide hole. An electrode for driving the device can be formed by bonding the optical device to the electric wiring with a conductive adhesive such that the electric contact can be secured. Accordingly, no special component or means for alignment is needed, and an optical mounting structure for the optical wiring, which is advantageous in mass-productivity, can be achieved.

The following specific configurations are also possible. The guide unit can be a guide hole that enables the optical device to be mounted at a position at which the optical device can couple to the optical waveguide sheet.

There can be further arranged in the optical waveguide sheet an optical-path converting unit for inputting or outputting light along a direction forming a predetermined angle (for example, perpendicularly) relative to the plane of the optical sheet, such that the optical device set in the guide unit can be optically coupled to the optical sheet through this optical path converting unit. More specifically, a protrusion of the optical path converting unit is formed on a substrate or a cladding layer, and a transparent resin of a waveguide core layer is formed on the substrate or cladding layer by dipping, casting, spin coating, or the like. And, another cladding layer is formed on the core layer, and the guide hole for mounting the device is formed by photography and etching, molding, laser-beam processing, or the like. Further, the electric wiring for flip-chip mounting can be formed.

In the above specific structure, the optical path converting unit is used to optically couple the optical device to the optical waveguide sheet. Alternatively, the optical device can be fixed in a predetermined attitude, for example, a slant position, or can be located within the optical waveguide sheet. In these cases, the optical device can be coupled to the optical sheet without any optical-path converting unit.

Where the optical path converting unit is the protrusion formed on the cladding layer, light emitted by the light emitting device fixed in the guide unit can be propagated in the optical sheet through a portion of the core layer formed by transferring of the above protrusion, or light propagating along the core layer can be caused to enter the light receiving device fixed in the guide unit through this portion of the core layer. The optical-path converting unit can also be a portion of the core layer formed by transferring of a protruded portion provided on a mold for forming the core layer.

The optical path converting unit can include a conical or semispherical mirror an apex of which is directed toward the center of a functional portion of the optical device set in the guide unit, such that light from the optical device can be reflected in all directions around the apex and distributed over 360 degrees about the apex. Thereby, light travelling from all directions around the apex along the optical waveguide sheet can be reflected toward the optical device and received thereby. Thus, using the above optical path converting unit, light from the light emitting device fixed in the guide unit can be broadcast in the optical sheet, or light from all light transmission sources in the optical sheet can be received by the light receiving device fixed in the guide unit.

The optical-path converting unit can also include a 45-degree mirror that reflects light from the optical device fixed in the guide unit toward a predetermined direction, or that reflects light from a predetermined direction toward the optical device fixed in the guide unit to be received thereby. Thus, using the above optical-path converting unit, light from the light emitting device fixed in the guide unit can be transmitted toward a predetermined region in the optical sheet, or light from a predetermined light transmission source in the optical sheet can be received by the light receiving device fixed in the guide unit.

Further, line waveguide for performing light transmission and receiving along a predetermined channel between optical devices fixed in the guide units can be formed in the two-dimensional slab waveguide. Where one two dimensional slab waveguide is used, signal multiplexing will be basically performed using the time division sharing, i.e., parallel serial conversion. However, when the line waveguide is formed in the two-dimensional slab waveguide, parallel transmission with independent channels can be employed for necessary lines.

The guide unit can be a guide hole for fixing an electric device, such as a resistor, a capacitor, and an integrated circuit (IC), such that the electric circuit can be built on the optical waveguide sheet. Thus, the optical waveguide apparatus can be versatilely employed.

A metal pattern for driving the optical device, or forming the electric circuit can also be formed on the optical waveguide sheet. In this structure, the terminal of the metal pattern can extend into the guide unit, and when the optical device or the electric device is set in the guide unit, its electrode or terminal is electrically connected to the terminal of the metal pattern.

The guide unit can be a guide hole formed correspondingly to the outer profile of the optical device or the electric device which is to be mounted on the optical sheet, or a guide hole with an inner wall formed correspondingly to the outer profile of the optical device or the electric device and an outer wall of any configuration.

According to yet another aspect of the present invention, there is provided an opto-electric mixture wiring substrate in which the above optical waveguide apparatus is mounted on and electrically connected to an electric circuit board such that the electric wiring of the electric circuit can be at least partly replaced by the optical wiring of the optical waveguide apparatus to operate an electronic apparatus thereby.

In the above opto-electric mixture wiring substrate, the optical waveguide apparatus can be mounted on an LSI package of the electric circuit board. Further, the optical waveguide apparatus can be flexible such that it can be approximately tightly mounted on an uneven surface of the electric circuit substrate with passive components and LSI mounted thereon. When the electric wiring is provided on a bendable and flexible optical waveguide sheet, a portion of the wiring in the electric board with LSI and the like mounted thereon can be executed by the optical waveguide apparatus of the present invention to construct the opto-electric mixture wiring substrate thereby. The problem of EMI can be solved at relatively low costs without any extensive design alteration of the electric board.

Further, a plurality of the optical waveguide apparatuses can be layered, and an electric via penetrating through a portion or all of the stacked optical waveguide apparatuses can be formed such that the electric wiring for driving optical devices on the optical waveguide apparatuses can be connected to the electric circuit board. Thus, the optical waveguide apparatuses need only to be integrated with the electric circuit board when a plurality of signal wirings are to be simultaneously executed. Here, the electric wiring for driving the optical device can be constructed when the optical device and the optical path converting unit are mounted on the optical waveguide sheet and the via filled with a conductor is formed in the stacked optical waveguide sheets. Thus, a multi-layer opto-electric mixture wiring board can be achieved at relatively low costs.

According to yet another aspect of the present invention, there is provided a method of fabricating an optical waveguide apparatus which includes a step of forming an optical-path converting unit in a cladding layer of the optical waveguide, a step of depositing a resin on the cladding layer to form a core layer, a step of depositing another resin on the core layer to form another cladding layer, a step of forming a guide unit for mounting the optical device therein at a predetermined location relative to the optical-path converting unit on the another cladding layer, and a step of forming an electric wiring on the another cladding layer. Alternatively, there is provided a method of fabricating an optical waveguide apparatus which includes a step of depositing a resin on a substrate with a mold for forming an optical path converting unit to form a core layer, a step of forming a guide unit for mounting the optical device therein at a predetermined location relative to the optical-path converting unit on the core layer, a step of forming an electric wiring on the core layer, and a step of removing the core layer from the substrate.

Those fabrication methods can further include a step of flip-chip bonding the optical device on the guide unit such that the optical device can be brought into an electric contact with the electric wiring.

These advantages, as well as others will be more readily understood in connection with the following detailed description of the preferred embodiments and examples of the invention in connection with the drawings.

BRIEF DESCRIPTION OF THE DRAWINGS

FIGS. 3A through 3E are cross-sectional views illustrating a method of fabricating the optical device integrated with the optical path converting unit of FIG. 2A.

DESCRIPTION OF THE PREFERRED EMBODIMENTS

Embodiments of an optical waveguide apparatus of the present invention will be described by reference to FIGS. 2A through 19.

Figure 1:
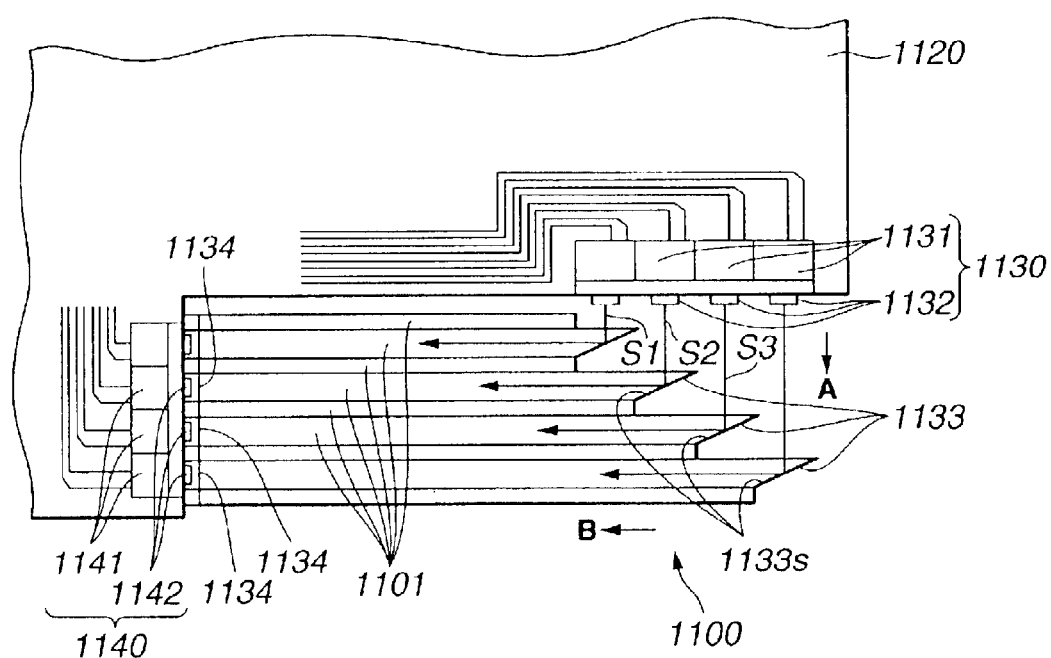
FIG. 1 is a view illustrating a conventional optical waveguide apparatus using a two-dimensional optical sheet.
Figure 2A:
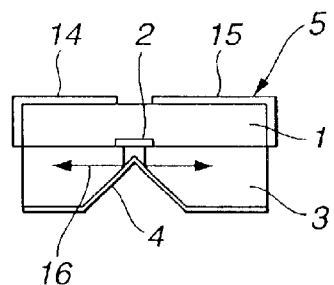
FIG. 2A is a cross-sectional view illustrating an optical device integrated with an optical-path converting unit constructed according to the present invention.
Figure 2B:
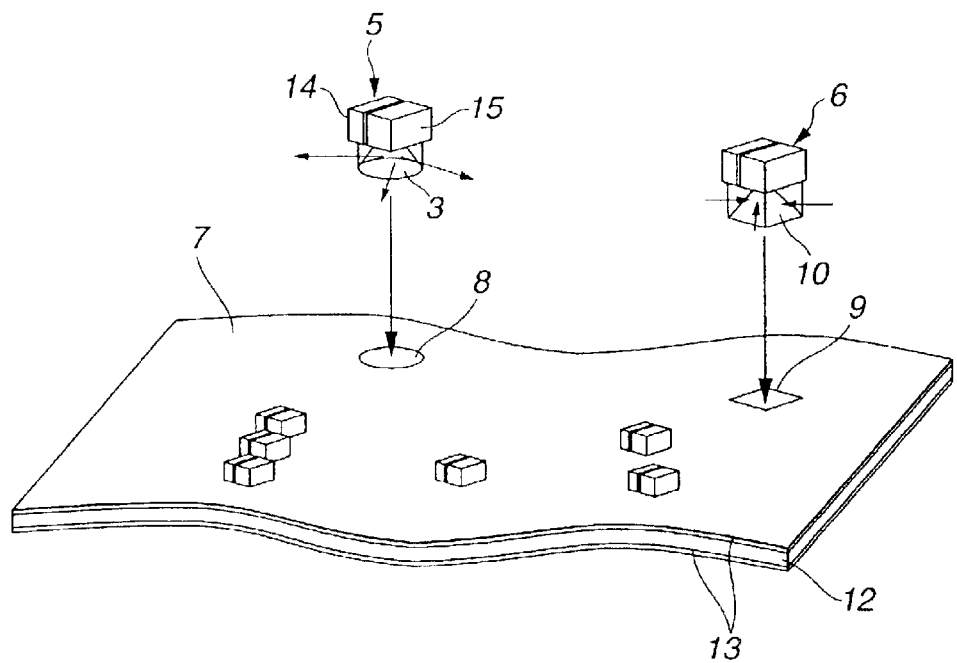
FIG. 2B is a perspective view illustrating a first embodiment of an optical waveguide apparatus with the optical device mounted thereon according to the present invention.

A first embodiment will be described by reference to FIGS. 2A through 4. In a light emitting device 5 used in the first embodiment, a surface light-emitting device 2, such as LED and a surface emitting laser, is mounted on a mount 1 formed of Si or ceramics, and the surface light-emitting device 2 can be driven through metal electrodes 14 and 15 on the mount 1. An optical-path converting unit 3 with a reflective mirror 4 for performing an optical-path conversion as indicated by reference numeral 16 is provided on the surface of a functional portion (i.e., a light emitting portion) of the surface light-emitting device 2. In this embodiment, the mirror 4 of the light emitting device 5 illustrated in FIG. 2B is a 45-degree conical mirror which can transmit light from the surface light-emitting device 2 in all directions in an optical waveguide sheet 7. A central line of the cone passing through its apex is aligned with a center of the functional portion of the surface light-emitting device 2. The optical-path converting unit 3 is formed of a polymer, such as PMMA, polycarbonate, and polyimide, that can facilitate formation of the unit 3. In a photo-detector 6 illustrated in FIG. 2B, light propagating in the optical sheet 7 is reflected upward by a four-sided pyramid mirror 10 of the optical-path converting unit, and received by the photo-detector 6.

The optical sheet 7 is also formed of a transparent polymer for the convenience of easy formation. In the optical sheet 7, a core layer 12 of a relatively large refractive index is sandwiched by upper and lower cladding layers 13 of a relatively low refractive index. The entire thickness of the optical sheet 7 is about 100 microns. A bendable and flexible two-dimensional sheet is thus constructed. In this embodiment, the core layer 12 is formed of a polycarbonate Z of a refractive index 1.59, and each cladding layer 13 is formed of Arton (name of product by AsahiKasei Kogyo Com.) of a refractive index 1.53. A light-absorbing portion, a roughed portion for scattering light, a tapering portion, or an antireflective coating is preferably formed on each end face of the optical sheet 7 such that light can be prevented from being reflected at the end face and adversely influencing the optical devices 5 and 6.

Reflection at interfaces between the optical-path converting units 3 and 10 and the core layer 12 can be minimized when these elements 3 and 10 are also formed of the polycarbonate Z and fixed to the optical sheet 7 with an epoxy optical adhesive or the like having a refractive index close to that of the polycarbonate Z. For example, where a hole 8 in the optical sheet 7 for setting the light emitting device 5 therein and a hole 9 for setting the light receiving device 6 therein have a cylindrical shape and a quadrangular-pole shape, respectively, the optical devices 5 and 6 can be self-selectively mounted on the optical sheet 7 in an auto-aligning manner. Outer profiles of the optical path converting units 3 and 10 are preferably formed as illustrated in FIG. 2B such that these units can be tightly fitted into the thus-shaped holes 8 and 9. Alternatively, shapes of all the holes can be made equal. In this case, each optical device can be mounted on the optical sheet 7 after the optical devices are assorted. In the structure of FIG. 2B, mount positions of the optical devices 5 and 6 have no directional characteristic in a plane of the optical sheet 7, so that the light emitting device 5 can be fitted into the hole 8 in any directional position and the light receiving device 6 can be fitted into the hole 9 in any one of four equivalent directional positions.

When the optical device has a directional characteristic, the following structures can be adopted, for example. Markers are formed on the optical-path converting unit and the hole, and these markers are aligned at the time of mounting. Alternatively, shapes of the optical-path converting unit and the hole are formed such that the converting unit can be fitted into the corresponding hole only in a predetermined positional relationship. The optical waveguide sheet 7 can be formed of any material that is sufficiently transparent to propagating light, such as glass, semiconductor, and organic material. For example, a glass substrate, a single-crystal substrate of lithium niobate, a semiconductor substrate of Si or GaAs, an organic sheet, or the like can be used as the optical waveguide sheet 7. The optical sheet 7 can also he formed by vacuum evaporation, dipping, coating, or the like. Further, the optical sheet 7 can be fabricated by injection molding, extrusion molding, or the like. The holes 8 and 9 can also be formed by any method such as etching. The depth of the hole is set such that the optical device fitted into the hole can function in a predetermined manner. The hole can penetrate the optical sheet 7.

As discussed above, the optical devices 5 and 6 can be mounted at any location on the optical waveguide sheet 7 without any alignment precision. Further, an additional optical device can be set at a desired location on a common optical waveguide sheet 7 according to the design of a circuit board, by a subsequent processing such as a step of forming a hole. Accordingly, the optical waveguide apparatus for constructing an opto-electric mixture wiring substrate can be flexibly fabricated at relatively low costs according the specification. This optical waveguide apparatus can also allow various design alterations. FIG. 2B only illustrates an example of the arrangement of a plurality of optical devices.

In this embodiment, since a two-dimensional slab waveguide is used as the optical sheet 7 as discussed above, light from the light emitting device 5 with the conical mirror 4 can be transmitted in all directions in the optical sheet 7. The light can be received by the photo detector 6 located at any place. This embodiment, however, cannot be applied to simultaneous transmission of multiple bits. In this case, parallel signals need to be converted to a serial signal. Nevertheless, a highly-functional opto-electric mixture substrate can be obtained by constructing an appropriate circuit design for replacing some signal lines, that require the solution of the EMI problem, with the optical waveguide sheet 7.

A fabrication method of the optical device with the optical-path converting unit will be described with reference to FIGS. 3A through 3E. Initially, an optical device 21 is die-bonded to a substrate 20 of alumina-ceramics, on top and bottom surfaces of which electrode patterns 17, 18, and 23 are formed, as illustrated in FIG. 3A. The optical device 21 includes its functional portion 19, such as a light emitting or light receiving region. The optical devices 21 are arranged at equal intervals (for example, 500 microns) in a two-dimensional array though only two devices appear in FIG. 3A. One electrode of the optical device 21 (for example, its cathode) is in contact with an electrode provided on the mounting substrate 20, while the other electrode of the optical device 21 is connected to the electrode 23 through a bonding wire 22.

Polycarbonate Z dissolved in an organic solvent, such as monochlorobenzene, is then deposited on the substrate 20 and the device 21 using a casting method or a spin-coating method, and dried. A polymer 24 is thus formed as illustrated in FIG. 3B.

The substrate 20 is then heated to a temperature of about glass-transition temperature (about 170° C. in the case of the polymer 24), and a mold 27 is pressed against the polymer 24 to form a conical recess 26 and a groove 25 between the devices 21, as illustrated in FIG. 3C.

In forming the groove 25 between the devices 21, the outer configuration of the groove 25 is shaped into a cylinder, a four-sided pyramid, or the like such that the above-discussed self-selective alignment can be performed.

A metal reflective film 28, such as an Al thin film, is then formed on the polymer 24 by vacuum evaporation or the like, as illustrated in FIG. 3D. After that, the structure is divided into chips of 500 square microns along the dicing groove 29 by a dicing saw. While the outer profile of the substrate 20 cut by the dicing is a four-sided pole, the outer profile of the polymer 24 formed on the substrate 20 is shaped into a necessary form. Here, the metal reflective film 28 is not necessarily needed. When no reflective film is formed, a small amount of light is transmitted also into an air portion in the conical recess 26. In most cases, however, influences due to this transmission can be neglected.

Side metal portions 30 for connecting the electrodes 23 and 17, and the electrodes 18 and 17 are then formed by vacuum evaporation or plating, as illustrated in FIG. 3E. Thus, the optical device with the optical-path converting unit can be achieved.

Material and forming method of the polymer are not limited to the above examples. For example, PMMA or polyimide can also be used as the polymer material, and etching, or LIGA process using the synchrotron orbit radiation (SOR) can also be used to form the optical-path converting unit. Further, the optical-path converting unit can also be formed using a thick-film photoresist, such as SU-8 (name of product by MicroChem Com.), that can be directly processed by photolithography.

A substrate with an optical device built therein, i.e., a so-called bare chip, can be used in place of the mounting substrate 20 with the optical device 21 mounted thereon. In this case, in FIG. 2A, reference numeral 2 designates a light emitting region, and reference numeral 1 designates a device substrate. Herein, the optical-path converting unit 3 is formed directly on the device substrate 1. The fabrication process can be simplified, and the chip size can be reduced. On the other hand, the thermal characteristic of the bare chip device is not so good, and its strength is relatively small. Therefore, the above optical device 21 and the bare-chip device need to be differently used according to the circumstance.

Figure 4:
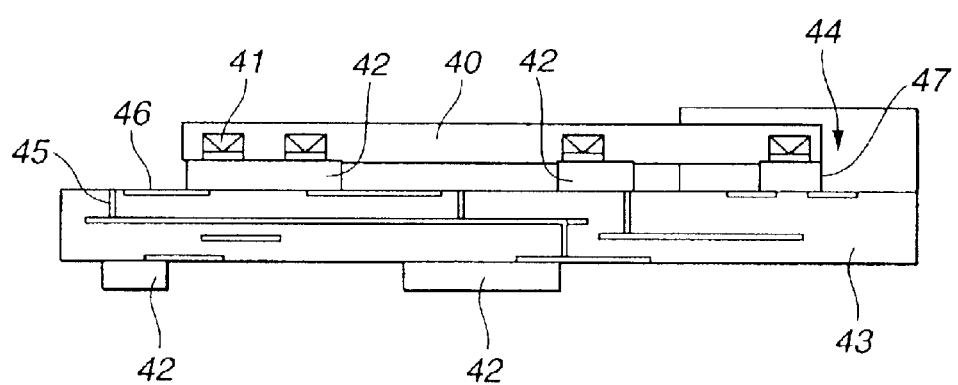
FIG. 4 is a cross sectional view illustrating an embodiment in which the optical waveguide apparatus of the first embodiment is mounted on an electric circuit.

FIG. 4 illustrates a structure in which the above discussed optical waveguide sheet is used on an electric circuit board. A cross section of an electric circuit board 43 in a small portable equipment such as a cellular phone is shown in FIG. 4. The board 43 has a multi-layer build-up structure, and electric wires 46 and via holes 45 are highly densely formed therein. An RF circuit portion 44 for wireless communication is covered with a shield cover to prevent the electromagnetic interference. Conventionally, when the signal line is drawn out from the RF circuit portion, an antenna is created depending on the length of the signal line. Hence, due to the common-mode noise radiation, the malfunction of the circuit is caused, and much designing time is required to overcome the regulations prescribed in the radio wave regulation law.

In the structure of FIG. 4, no antenna is created since the signal wiring is constructed using an optical waveguide sheet 40, and hence, unwanted radiation can be greatly reduced. Input/output (I/O) terminals for optical wiring are formed on packages such as LSIs 42 and 47, and optical devices 41 with an optical-path converting unit are flip-chip bonded on these terminals. The opto electric mixture wiring substrate can be constructed by placing and bonding the optical sheet 40 with holes for fitting the optical device 41 therein on the optical devices 41. As illustrated in FIG. 2B, it is possible that after the optical device 41 is set in the optical sheet 40, the thus-fabricated optical waveguide apparatus is aligned with and bonded to the electric circuit board 43.

According to this embodiment, the design alteration of the electric circuit board 43 can be minimized, and the optical waveguide apparatus of the present invention can be readily mounted on the electric circuit. Therefore, EMC (electromagnetic compatibility) can be achieved without increasing the cost.

Figure 5:
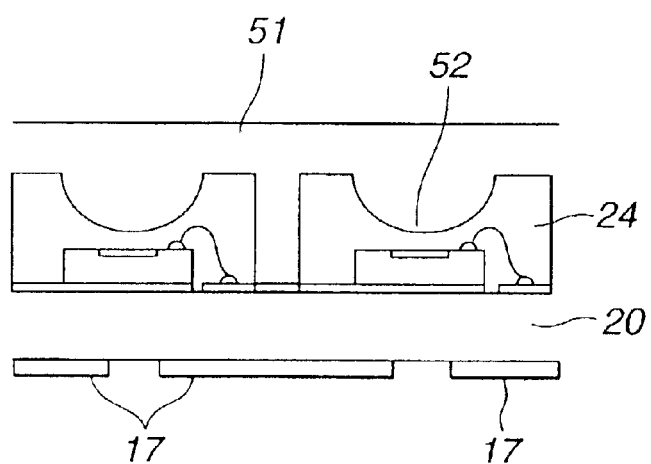
FIG. 5 is a cross-sectional view illustrating an optical device integrated with an optical-path converting unit of a second embodiment according to the present invention.

In the first embodiment, the optical-path converting unit 3 includes the conical reflective mirror 4, but other mirror, such as a semispherical mirror, can also be used. Its cross section is shown in FIG. 5 illustrating a second embodiment. In the second embodiment, a mold 51 with a semispherical protrusion is fabricated, and a semispherical recess 52 is formed in the polymer 24 by pressing the mold 51 against the heated polymer 24 in the same manner as that of the first embodiment. A central line of the semispherical recess 52 passing through its apex is aligned with a center of the functional portion of the optical device. A metal film or the like can be vacuum evaporated on the surface of the recess 52 to increase the reflectivity thereof.

In such an optical-path converting unit, optical coupling between the optical device and the optical waveguide sheet slightly decreases since a light component travelling in directions forming angles below the critical angle of the optical sheet increases. The second embodiment is, however, advantageous in that the mold 51 can be relatively readily fabricated and in that processing defects at the time of pressing the mold 51 against the polymer 24 hardly occur since no sharp portion exists in the mold.

A fabrication method of the semispherical mold 51 will be described with reference to FIGS. 6A through 6F. FIGS. 5B, 6D and 6F are plan views, and FIGS. 6A, 6C and 6E are cross-sectional views taken along the line A–A' of FIG. 6B, which correspond to FIGS. 6B, 6D and 6F, respectively.

Figure 6A:
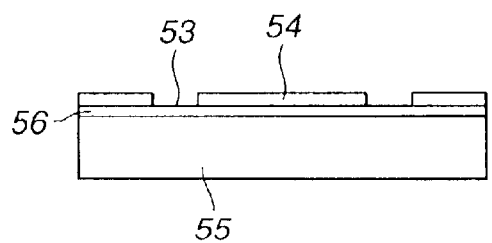
FIGS. 6A through 6F are views illustrating a method of fabricating a mold for fabricating the optical-path converting unit of FIG. 5.
Figure 6B:
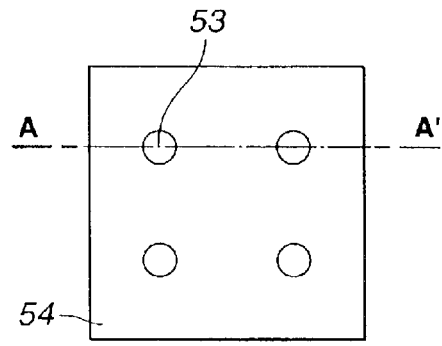
Figure 6C:
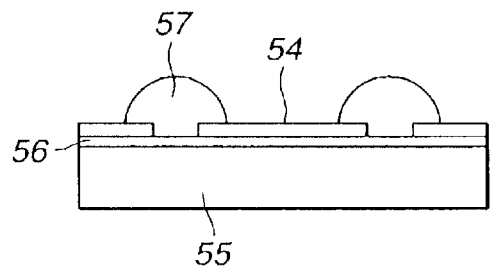
Figure 6D:
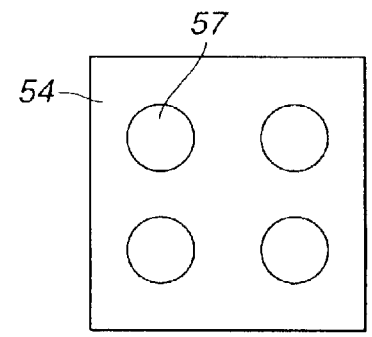
Figure 6E:
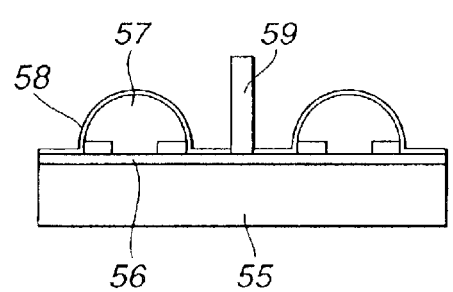
Figure 6F:
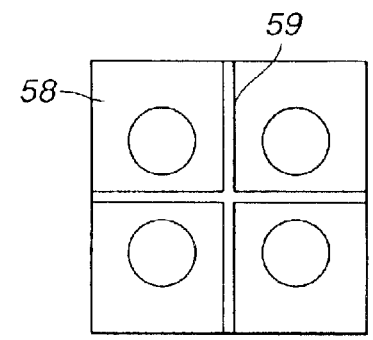

In FIGS. 6A and 6B, a substrate for a mold is an Si substrate 55, for example. A Ti/Au layer 56 is formed as a cathode electrode for plating all over the surface of the substrate 55, and a window region 53 for plating is patterned using a photoresist 54. Ni electroplating is then performed to form a semispherical structure 57 in the window region 53, illustrated in FIGS. 6C and 6D. Here, the diameter of the semi-sphere 57 is 80 microns, for example.

Thereafter, the resist 54 is removed, and a plated layer 58 of about 5 microns in thickness is formed all over the surface without any resist to reinforce a stem portion of the semi-spherical plated layer 58. A partition 59 for separating the devices is then formed in a parallel cross pattern by processing a metal or the like. This partition 59 is bonded on the plated layer 58 to complete the mold 51. Although a 2×2 array is depicted in FIG. 6F, the array is actually formed all over the substrate 55.

As described above, the polymer 24 is pressed against the thus-fabricated mold 51. Alternatively, the profile of the mold 51 can be transferred to the polymer by forming a flat polymer on the mold 51 and removing the polymer from the mold 51. In this case, after the polymer is removed from the mold, the shaped polymer is aligned with the device array and bonded thereto with an adhesive.

When conditions for creating a rough plated surface are set at the time of plating (for example, the plating rate is raised, or a plating material is changed), there can be obtained a mold that can fabricate such an optical-path converting unit as has a light scattering function as well. The light scattering increases a component of propagating light incident on the interface between the core layer and the cladding layer of the optical sheet at angles larger than the critical angle. Therefore, the efficiency of optical coupling between the optical waveguide sheet and the optical device can be increased.

Similarly, an optical-path converting unit with a profile of a multi-sided pyramid or an oval can be formed. Also in this case, its central line passing through its apex is preferably aligned with a center of the functional portion of the optical device.

Figure 7A:
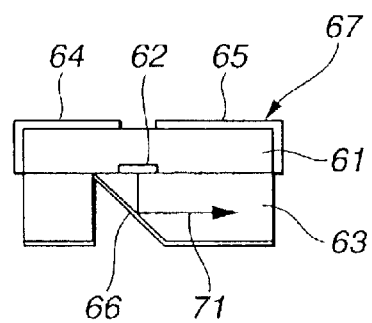
FIG. 7A is a cross-sectional view illustrating an optical device integrated with an optical-path converting unit constructed according to the present invention.
Figure 7B:
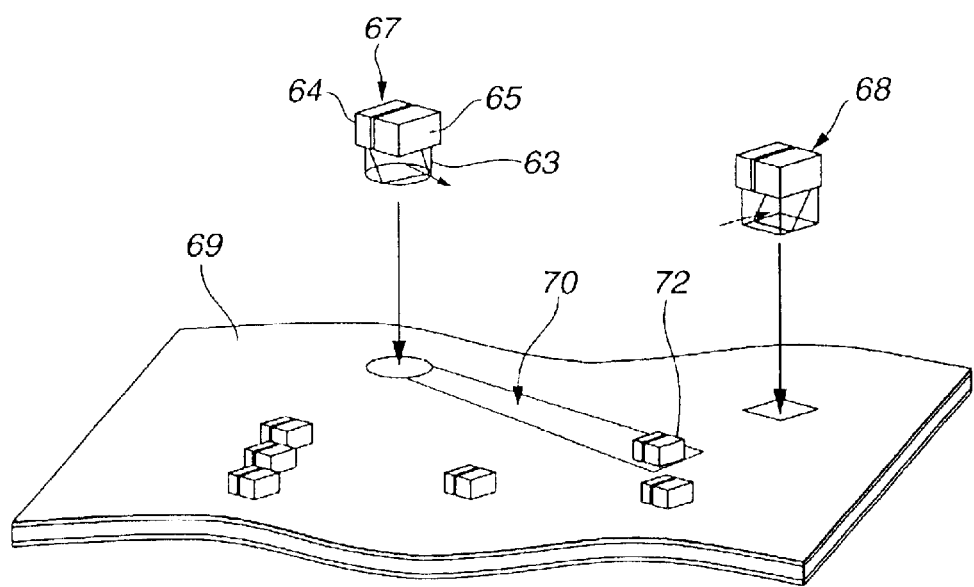
FIG. 7B is a perspective view illustrating a third embodiment of an optical waveguide apparatus with the optical device mounted thereon according to the present invention.

In the above embodiments, light from the light emitting device is propagated in all directions in the two-dimensional slab waveguide sheet through the optical-path converting unit. In a third embodiment, light is propagated in a predetermined direction by a 45 degree mirror 66 as illustrated in FIGS. 7A and 7B. In the third embodiment, when a light source 62 is a surface emitting laser having a high directivity (its emission angle is less than ten (10) degrees), light transmission is possible with a predetermined photo-detector mounted anywhere in a circuit board with an ordinary size (about 10 cm), even using a two-dimensional slab waveguide sheet 69. As illustrated in FIG. 7A, an optical device 67 integrated with an optical path converting unit 63 includes a mounting substrate 61, and electrodes 64 and 65. Light from the surface emitting laser 62 is directed toward a propagation direction 71 by the 45-degree mirror 66.

As illustrated in FIG. 7B, optical devices 67 and 68 with the optical path converting unit are mounted on the two-dimensional optical sheet 69, and light emitted from the light emitting device 67 is propagated along a limited region 70 and received only by a light receiving device 72. Also in the light receiving device 68, only light propagated from a predetermined direction can be received through the 45-degree mirror. In FIG. 7B, the 45 degree mirror in each of the light emitting device 67 and the light receiving device 68 is illustrated in a simplified manner.

In the third embodiment, the following construction is possible. Light propagating in all directions and light propagating in a predetermined direction can be present in a mixed manner, and the photo-detector discriminates, separates and detects the propagated light based on its optical power, receiving timing, or the like. Specifically, the optical power loss is small when light is propagated in a predetermined direction, so that the power reaching the photo-detector of this case is larger than the case where light is propagated in all directions in the optical sheet. Using this characteristic, the photo-detector can discriminate and separate the propagated light. Further, where light transmission with the directivity is performed, its optical power reaching the photo-detector varies depending on the transmission distance. Accordingly, the photo-detector can discriminate and separate signals based on the location of the light transmission source.

Figure 8:
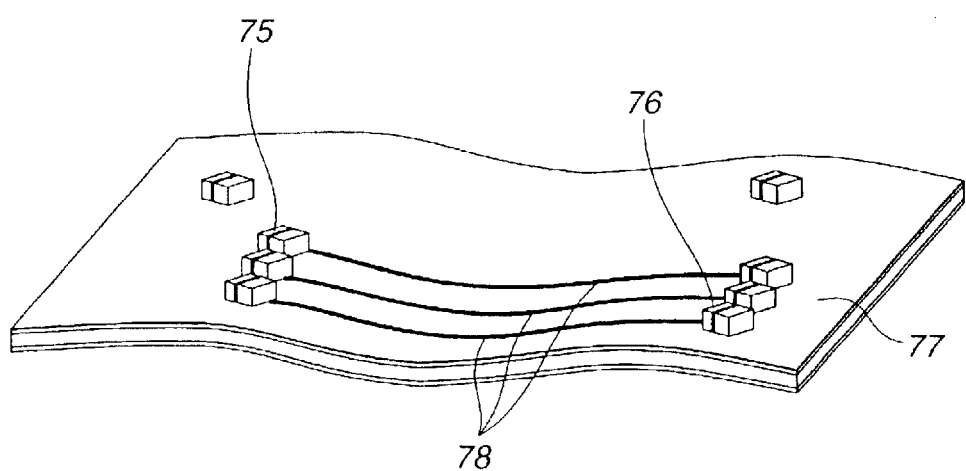
FIG. 8 is a perspective view illustrating a fourth embodiment of an optical waveguide sheet with line waveguides formed therein according to the present invention.

A fourth embodiment relates to an optical waveguide sheet 77 which includes line waveguide with a laterally confining structure, as well as a two-dimensional slab waveguide, as illustrated in FIG. 8. Predetermined lines between optical devices 75 and 76 are established by the line waveguides 78, respectively. Light confined in the line waveguide 78 does not spread over the optical sheet 77. When the light emitting device inputs light into the line waveguides 78, the optical-path converting unit of the light emitting device is preferably the 45 degree mirror as discussed in the third embodiment. However, the optical-path converting unit for spreading light over the optical sheet as described in the first and second embodiments can also be used though only a portion of the light from the light emitting device enters the line waveguide 78. In this embodiment, signal transmission can also be performed between the light emitting device and the light receiving device through the two-dimensional slab waveguide 77. At this time, there is a possibility that the light propagating in the two-dimensional slab waveguide 77 causes a cross-talk with the light propagating along the line waveguide 78. The power level of light leaking into the line waveguide 78 is low, so that the photo-detector can separate and detect the light propagating along the line waveguide 78 between the optical devices 75 and 76.

The line waveguide 78 can be formed as follows, for example. In the case of polycarbonate Z, monochlorobenzene mixed with monomer is coated, and the coated material is then exposed to radiation through a photo-mask having a pattern as illustrated in FIG. 8. Polymerization occurs only in the exposed region, and the refractive index increases only in a polymerized portion to form the line waveguide 78.

The line waveguide 78 can also be formed by a method in which a heated mold is pressed against the optical waveguide sheet 77 to form a protruded line of the line waveguide 78. The fourth embodiment can be preferably employed when parallel transmission is needed.

Figure 9:
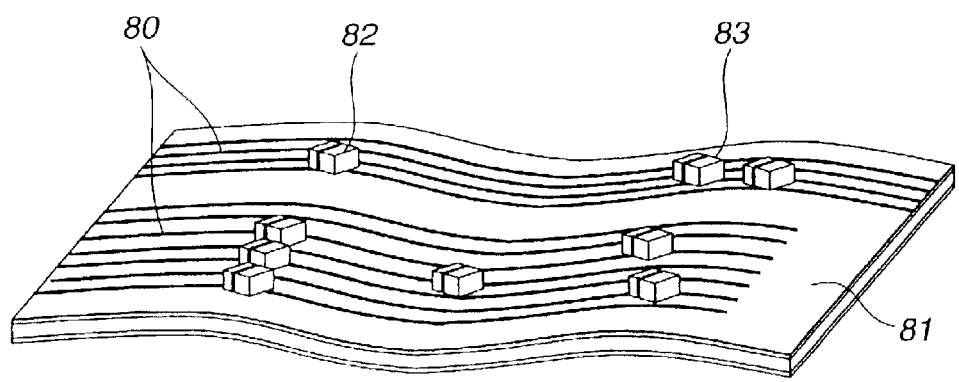
FIG. 9 is a perspective view illustrating a fifth embodiment of an optical waveguide sheet with electric wires formed thereon according to the present invention.

A fifth embodiment relates to an optical waveguide sheet in which electric wires 80 are formed on a flexible substrate 81 as illustrated in FIG. 9. The electric wire 80 can be used as an electric wiring connected to optical devices 82 and 83 integrated with an optical-path converting unit constructed according to the present invention. The electric wire 80 can be further used as an auxiliary jumper on an electric circuit board 97 in which electric wires 94 and via holes 95 are densely formed as illustrated in FIG. 10.

Figure 10:
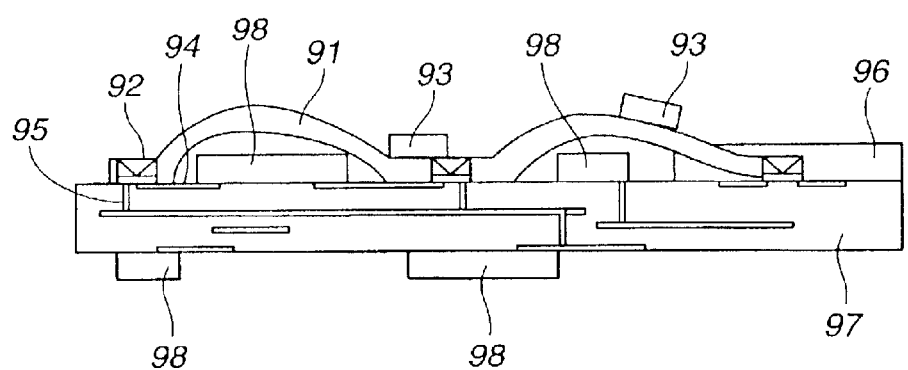
FIG. 10 is a cross-sectional view illustrating an embodiment in which the optical waveguide sheet of the fifth embodiment is mounted on an electric circuit.

Such a flexible optical waveguide sheet 91 of the present invention can be approximately tightly mounted on an uneven surface of LSIs 98 as illustrated in FIG. 10, without any design alteration of the electric circuit board 97 having an RF circuit 96. Therefore, EMC can be achieved without increasing the cost. In this embodiment, electrodes of an optical device 92 with an optical-path converting unit are flip-chip bonded directly on the electric circuit board 97 in a portable equipment. The optical sheet 91 having holes for fitting the optical devices 92 therein is placed on the electric circuit board 97 with the optical devices 92 flip-chip bonded thereon, and necessary locations are bonded between the sheet 91 and the board 97. An opto-electric mixture wiring substrate can be thus fabricated.

An electric-device chip 93 using the electric wire 80 as illustrated in FIG. 9 can also be mounted on the optical sheet 91 when the chip 93 is necessary.

Figure 11A:
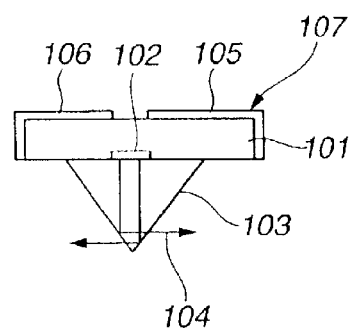
FIG. 11A is a cross-sectional view illustrating an optical device integrated with an optical-path converting unit constructed according to the present invention.
Figure 11B:
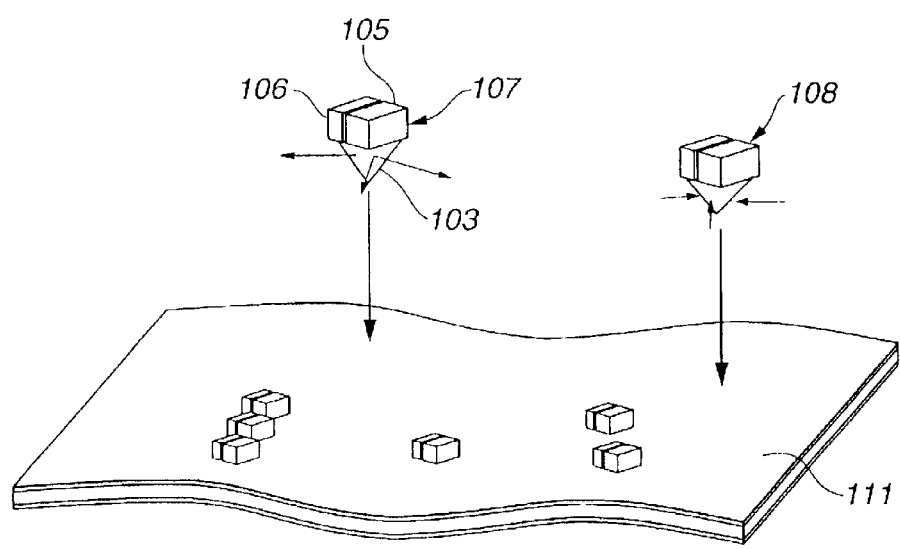
FIG. 11B is a perspective view illustrating a sixth embodiment of an optical waveguide apparatus with the optical device mounted thereon according to the present invention.

A sixth embodiment is illustrated in FIGS. 11A and 11B. In the sixth embodiment, an optical-path converting unit 103 of an optical device 107 includes a half mirror or a reflective and refractive portion as illustrated in FIG. 11A. The optical-path converting unit 103 has a conical profile a central line of which is aligned with a center of a functional portion 102 of the optical device 107. The optical device 107 of FIG. 11A includes a mounting substrate 101 and electrodes 105 and 106. Reference numeral 104 designates a propagation direction of light.

In the sixth embodiment, materials of an optical waveguide sheet 111 and the optical-path converting unit 103 are different in the refractive index and the glass-transition temperature. For example, the half-mirror 103 is formed of a material, such as SU-8 or polyimide, whose glass-transition temperature is relatively high, i.e., higher than 200° C. The optical sheet 111 is formed of PMMA or the like whose glass-transition temperature is approximately 120° C. Here, an Au thin film having a thickness of about 15 nm is vacuum-evaporated on the half-mirror. Refractive indices of the optical sheet 111 and the optical-path converting unit 103 can vary, and can be set according to the situation. The optical-path converting unit 103 can be fabricated in a manner similar to the method described in the first embodiment.

Although optical devices 107 and 108 can be set in holes formed in the optical waveguide sheet 111 as discussed in the above embodiments, the optical devices 107 and 108 are mounted on the optical sheet 111 in the sixth embodiment as follows. The optical waveguide sheet 111 is heated, and the half-mirror 103 of the optical device is pressed against the heated optical sheet 111 and mounted at a desired location on the heated optical sheet 111. The optical device with the optical-path converting unit in the above embodiments can also be pressed against the heated optical sheet. In this case, an air portion is not necessarily formed at the interface of the optical-path converting unit, and hence, the metal reflective film 28 (see FIG. 3E) should be preferably formed on the optical-path converting unit. Alternatively, the optical device with the optical-path converting unit of the sixth embodiment can be mounted in the manner as discussed in the first embodiment. In this case, the hole for fitting the optical-path converting unit therein needs to has a shape exactly corresponding to the profile of the optical path converting unit such that no air portion is generated at the interface of the optical-path converting unit.

In the structure illustrated in FIG. 11B, the optical sheet 111 of PMMA is heated to a temperature close to 120° C. of its glass-transition temperature, and the optical devices 107 and 108 temporarily bonded on a glass substrate with an electron wax or the like are pressed against the heated optical sheet 111. Thereby, the sharp optical-path converting unit 103 of the optical device is stuck into the optical sheet 111. At the same time, the glass substrate can be removed from the optical devices 107 and 108 stuck into the optical sheet 111 when the wax has a melting point at about 120° C. After that, the wax on the optical devices 107 and 108 is washed away, and the optical device is fixed with an adhesive. Thus, the optical devices 107 and 108 can be firmly mounted on the optical sheet 111 readily.

Figure 12A:
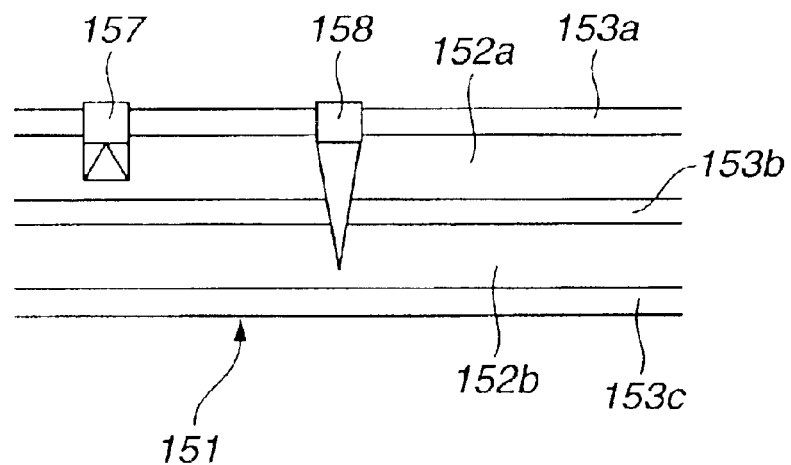
FIGS. 12A and 12B are cross-sectional views illustrating embodiments of stacked optical waveguide sheets constructed according to the present invention.
Figure 12B:
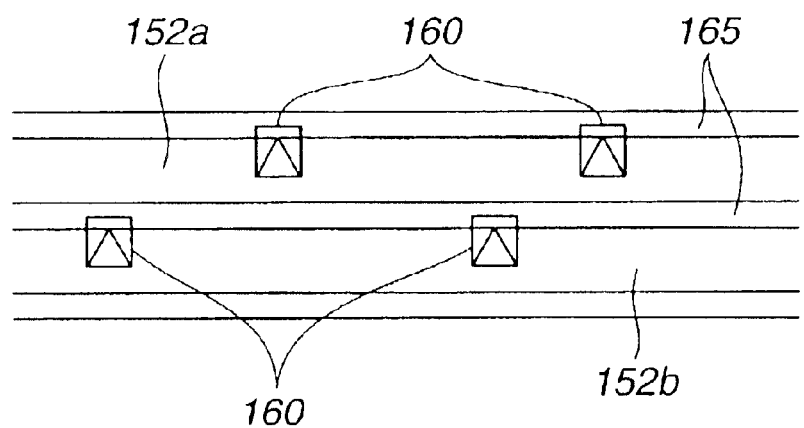

In all of the above embodiments, a single optical waveguide sheet is used, but a plurality of optical waveguide sheets can be entirely or partly stacked. FIGS. 12A and 12B illustrate such examples. In FIG. 12A, optical devices 157 and 158 are mounted on a multi-layer optical waveguide sheet in which cladding layers 153a–153c and core layers 152a–152b are alternately piled up, and one optical device 157 is coupled to an uppermost layer 152a only while the other optical device 158 is coupled to both upper and lower layers 152a and 152b. In the structure of FIG. 12B, a plurality of optical waveguide apparatuses with optical devices 160 as discussed in the first embodiment are piled up. The surface of each optical waveguide apparatus is flattened as indicated by reference numeral 165. In the case of FIG. 11B, there is a need to draw out electrodes of each optical device, and this can be achieved by the electric wires 80 as illustrated in FIG. 9.

Figure 13:
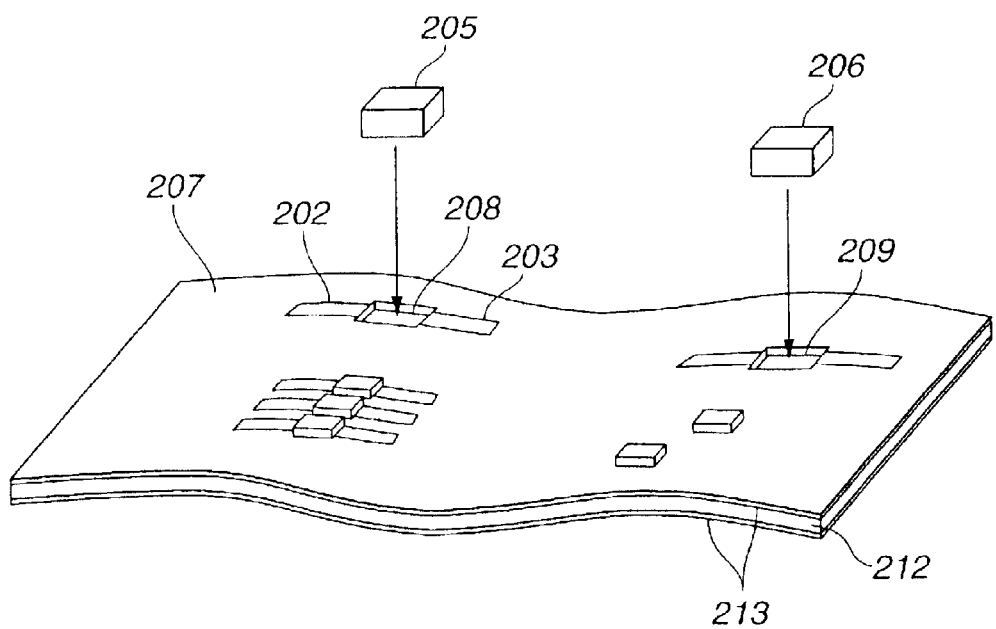
FIG. 13 is a perspective view illustrating a seventh embodiment of an optical waveguide apparatus with an optical device mounted thereon according to the present invention.

FIG. 13 illustrates a seventh embodiment of an optical waveguide apparatus. As illustrated in FIG. 13, a surface light-emitting device 205, such as LED and a surface emitting laser, is provided as a light source, and a guide hole 208 for fitting the optical device 205 therein is formed in an optical waveguide sheet 207. The guide hole 208 corresponds to the outer profile of the optical device 205 such that the device 205 can be guided in the hole 208 in a self aligning manner. Metal wires 202 and 203 are also formed on the optical sheet 207, and ends of each wire extends into the guide hole 208 such that electrodes of the light emitting device 205 can be brought into contact with the ends of the metal wires 202 and 203 when the device 205 is set in the hole 208.

A mirror 219 (not shown in FIG. 13 but shown in FIGS. 14A to 14D) for converting an optical path is formed at a location of the optical sheet 207 below the guide hole 208 for fitting the optical device 205 therein. When the light emitting device 205 is set in the guide hole 208, the optical device 205 is aligned with the above mirror 219 such that light emitted from the optical device 205 can enter the optical sheet 207 through the mirror. In this embodiment, the mirror is a 45-degree conical mirror that enables light from the light emitting device 205 to propagate in all directions in the optical waveguide sheet 207. Thus, transmission light can be propagated in the entire sheet 207 of a two-dimensional slab waveguide.

Another guide hole 209 is also formed in the optical sheet 207, and an optical-path converting unit of a 45-degree conical mirror is formed below the guide hole 209. When a photo-detector 206 is mounted in the guide hole 209, the optical-path converting unit can reflect upward light propagated from all directions in the optical sheet 207 and the photo-detector 206 can receive the reflected light.

The optical sheet 207 is formed of a transparent polymer for the convenience of easy formation. In the optical sheet 207, a core layer 212 of a relatively large refractive index is sandwiched by upper and lower cladding layers 213 of a relatively low refractive index. The entire thickness of the optical sheet 207 is about 100 microns. A bendable and flexible two-dimensional sheet is thus constructed. In this embodiment, the core layer 212 having a thickness of 100 microns is formed of polycarbonate Z of a refractive index 1.59, and each cladding layer 213 having a thickness of 100 microns is formed of Arton of a refractive index 1.53. An light absorbing portion, a roughed portion for scattering light, a tapering portion, or an antireflective coating is preferably formed on each end face of the optical sheet 207 such that adverse light reflection at the end face can be prevented.

The optical path converting unit formed in the optical sheet 207 can be formed as follows. After a cladding material is processed using injection molding or heating, a core material is formed on the processed cladding material by dipping, casting, coating, or the like.

The light emitting device 205 and the photo-detector 206 can be flip-chip bonded on the optical sheet 207 and brought into contact with the metal wires 202 and 203 as follows. An Ag paste or a cream solder is coated on a predetermined location by printing or using a dispenser, and the optical devices 205 and 206 are inserted into the guide holes 208 and 209 and heated to a temperature of about 150° C.

The electric wires 202 and 203 are metal wires of aluminum, copper, or the like. These wires can be formed by forming a wiring pattern of Al, Cu, Ag, Au or the like using vacuum evaporation and lithography. The electric wires 202 and 203 can also be formed in the following manners. A conductive paste of Cu, Ag, Au or the like is printed on the substrate by a screen printing method to form a circuit conductor pattern, and the circuit conductor is then formed by sintering or hardening the conductive paste. Alternatively, a metal foil such as an electrolytic copper foil is deposited, and the metal foil is chemically etched using an etching resist with a desired pattern to form the circuit conductor pattern. Further, the wiring can be formed with a conductive polymer that has the thermal expansion coefficient and the elastic constant sufficiently matching those of the polymer waveguide.

In the structure of FIG. 13, the optical devices 205 and 206 can be completely buried in the guide holes 208 and 209 though the mounted optical devices 205 and 206 slightly protrude from the surface of the optical waveguide sheet 207 in FIG. 13. Further, the optical device can be buried in the guide hole such that the functional portion of the optical device can lie in the core layer 212. In this case, the optical device can be optically coupled to the optical sheet without the optical-path converting unit. When a ring laser or a spherical optical device is used, light from the light emitting device 205 can be propagated in all directions in the optical sheet, or light propagated from all directions in the optical sheet can be received by the photo-detector 206. Furthermore, when the guide hole for setting the optical device in a slant attitude is formed, the optical device can be optically coupled to the optical sheet without the optical path converting unit. When the optical device is mounted in the optical waveguide sheet 207 in such a manner, the optical waveguide apparatus can be fabricated with high productivity without any precise alignment.

The light emitting device is a vertical cavity surface emitting laser (VCSEL) in which a GaAs/AlGaAs MQW (multi-quantum well) active layer, a spacer layer of one wavelength cavity, a pair of AlAs/AlGaAs DBR(distributed Bragg reflector) mirror are grown on a GaAs substrate using a crystal growth method such as MOCVD, for example. The spherical device can be constructed by forming an active layer sandwiched between cladding layers on a spherical Si substrate. In the spherical device, light-emitting or light-receiving manner can be designed by the configuration of electrodes formed on the sphere. The light receiving device is a Si PIN photodiode (PD), for example.

In this embodiment, a two-dimensional slab waveguide is used as the optical sheet 207. Therefore, light from the light emitting device 205 with the conical mirror can be transmitted in all directions in the optical sheet 207. The light can be received by the photo detector 206 located at any place. However, this embodiment cannot be applied to simultaneous transmission of multiple bits. In this case, signals need to be converted to a serial signal. Nevertheless, a highly-functional opto electric mixture wiring substrate can be constructed by establishing an appropriate circuit design for replacing only signal lines, that require the solution of the EMI problem, with the optical waveguide sheet 207. An example of arrangement of plural optical devices is illustrated in FIG. 13.

Figure 14A:
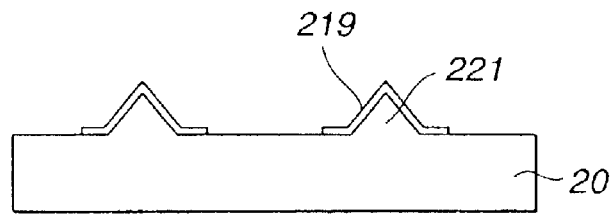
FIGS. 14A through 14D are cross sectional views illustrating a method of fabricating the optical waveguide apparatus of FIG. 13.

A fabrication method of the optical waveguide apparatus of the seventh embodiment will be described with reference to FIGS. 14A through 14D each of which depicts the cross section of a portion including the optical-path converting unit and exemplifies two optical-path converting units. Initially, a cladding substrate 220 provided with conical protrusions 221 with a 90-degree apex (two optical-path converting units) is fabricated by injection molding using a mold, as illustrated in FIG. 14A. The protrusion 221 can also be formed in the following manners. A flat cladding material is heated and processed by pressing a mold to the heated material, protrusions are bonded to a flat cladding material, or plating is locally performed to form the protrusions. A light reflective layer 219 of Al, Au, Ag or the like can be formed on the protrusion 221. Where the protrusion 221 is fabricated by metal plating, its surface itself can be used as a mirror.

Figure 14B:
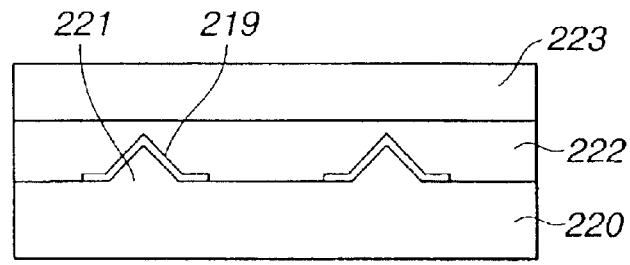
Figure 14C:
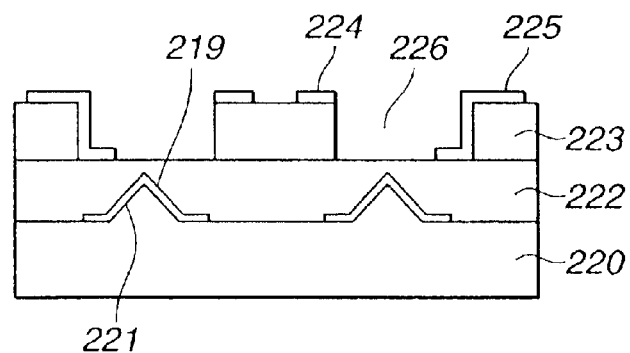

Core layer 222 and cladding layer 223 are formed by dipping, spin-coating, casting or the like, as illustrated in FIG. 14B. A guide hole 226 for mounting the optical device is then formed in the cladding layer 223 in alignment with the conical protrusion 221, and metal wires 224 and 225 for electrode contact with the optical device are formed as illustrated in FIG. 14C. The hole 226 can be formed by photolithography and etching, pressing of a mold, or laser-beam processing. The guide hole 226 is formed to a depth of the core layer 222 in FIG. 14C, but it can be formed to a depth halfway in the cladding layer 223. The depth of the hole can be selected according to the situation.

Figure 14D:
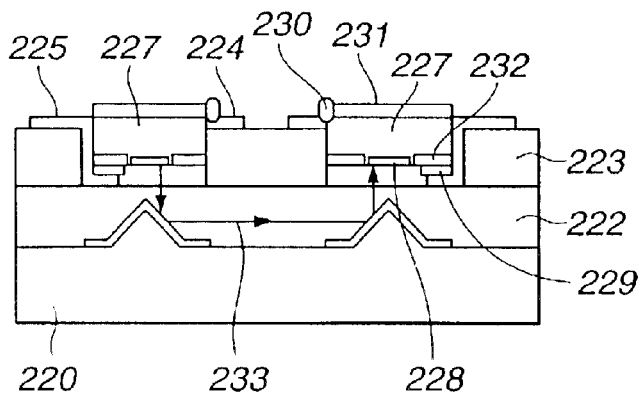

An optical device 227 is fitted into the guide hole 226 and flip-chip mounted as illustrated in FIG. 14D. Here, electrodes 231 and 232 of the optical device 227 are brought into contact with the metal wires 224 and 225 with conductors 229 and 230 such as an Ag paste, a cream solder or the like. The conical protrusion 221 and the guide hole 226 are formed such that a central line passing through the apex of the conical protrusion 221 is aligned with a center of a functional portion 228 of the optical device 227. Thus, there can be provided an optical waveguide apparatus in which light transmission can be performed as indicated by reference numeral 233 to achieve signal transmission and receiving in the two-dimensional waveguide sheet. A multi-sided pyramid mirror or a 45-degree mirror can also be used as the optical-path converting unit.

Figure 15:
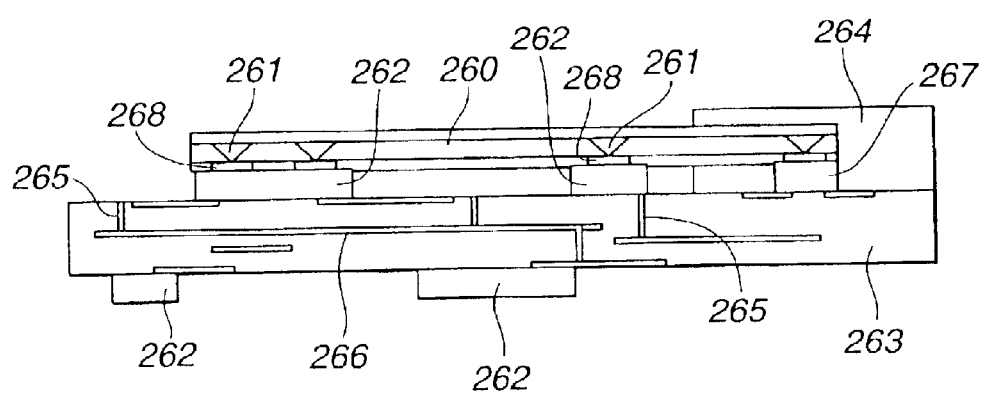
FIG. 15 is a cross-sectional view illustrating an embodiment in which the optical waveguide sheet of the seventh embodiment is mounted on an electric circuit.

FIG. 15 illustrates a structure in which the above-discussed optical waveguide sheet is used on an electric circuit board. The cross section of an electric circuit board 263 in a compact portable equipment such as a cellular phone is shown in FIG. 15. The board 263 has a multi-layer build-up structure, and electric wires 266 and via holes 265 are highly densely formed therein. An RF circuit portion 264 for wireless communication is covered with a shield cover to prevent the electromagnetic interference. Conventionally, when the signal line is drawn out from the RF circuit portion, an antenna is created depending on the length of the signal line. Hence, due to the common mode noise radiation, the malfunction of the circuit is caused, and much designing time is required to overcome regulations of the radio-wave regulation law.

In the structure of FIG. 15, since no antenna is created when the signal wiring is constructed using an optical waveguide sheet 260, unwanted radiation can be greatly reduced. Input/output (I/O) terminals for optical wiring are formed on packages such as LSIs 262 and 267, and the optical sheet 260 is mounted on the board 263 such that those terminals are in contact with the electric wiring for driving an optical device 268 with an optical-path converting unit 261 set on the optical waveguide apparatus.

According to this embodiment, the design alteration of the electric circuit board 263 can be minimized, and the optical waveguide apparatus of the present invention can be readily mounted on the electric circuit. Therefore, EMC can be achieved without increasing the cost.

The above guide hole can also be used as a guide for fitting therein a conductor for simply connecting electric wires, or an electric device for forming an electric circuit, such as a resistor, a capacitor, and IC, other than the optical device. Further, a simple piece can be fitted into the guide hole to put the electric wires in a disconnected condition. In addition, a plurality of devices, such as a laser array, can be fitted into the guide hole, as well as a single device. In this case, ends of the electric wires, the number of which corresponds to the number of devices fitted in the guide hole, can extend into the guide hole. Each optical-path converting unit, such as a conical mirror, can be formed in the optical waveguide sheet corresponding to each place at which each device is to be set.

Figure 16:
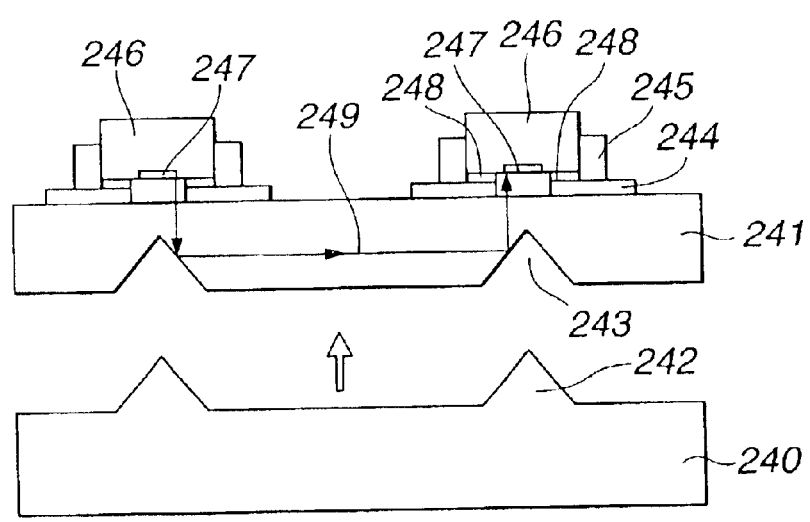
FIG. 16 is a cross-sectional view illustrating an eighth embodiment of an optical waveguide apparatus according to the present invention.

FIG. 16 illustrates an eighth embodiment. In this embodiment, protrusions are formed in a core layer 241 itself to simplify the structure of the optical waveguide sheet, while the protrusion of the optical path converting unit is formed in the cladding layer in the seventh embodiment. Further, the thickness of a cladding layer 241 in the eighth embodiment is made as thin as possible, or the cladding layer is omitted.

As illustrated in FIG. 16, a transparent resin, such as polycarbonate Z, is coated on a mold 240 with protrusions 242 by dipping or spin-coating to form the core layer 241. On a surface of the core layer 241 opposite to the side of the mold 240, electric wires 244 for driving an optical device 246 are formed like the seventh embodiment. A guide frame 245 for guiding the optical device 246 is further formed with a photosensitive resin or the like. As the photosensitive resin, PIMEL of a polyimide group, or SU-8 can be preferably used.

In the eighth embodiment, the thickness of the core layer 241 is 100 microns, and the thickness of the guide frame 245 is 50 microns. The optical device 246 polished to a thickness of about 100 microns is fixed in the guide frame 245 with an Ag paste such that electrodes 248 of the optical device 246 can be in contact with the electric wires 244 in the same manner as the seventh embodiment.

The optical waveguide apparatus can be obtained by removing the sheet 241 from the mold 240. If necessary, a cladding material can be thinly coated on one or both surfaces of the optical sheet 241. The thin cladding layer serves as a protective layer, or acts to further smooth the surface of the core layer 241 and improve the light propagation characteristic of the air-clad sheet 241 compared to a core layer without any cladding layer. In the eighth embodiment, the reflective mirror of the optical-path converting unit is constructed by the interface between a recess portion 243 of the core layer 241 and an air. This structure has small light input/output and propagation losses, and is very simple. Accordingly, its productivity is excellent, and it is suitable for achieving an optical wiring at relatively low costs. A metal reflective layer or the like can be layered on the surface of the recess 243 like the seventh embodiment.

Thus, there can be obtained an optical waveguide apparatus in which light transmission can be performed as indicated by reference numeral 249 to achieve signal transmission and receiving between functional portions 247 of the optical devices 246 in the two-dimensional waveguide sheet 241.

Figure 17:
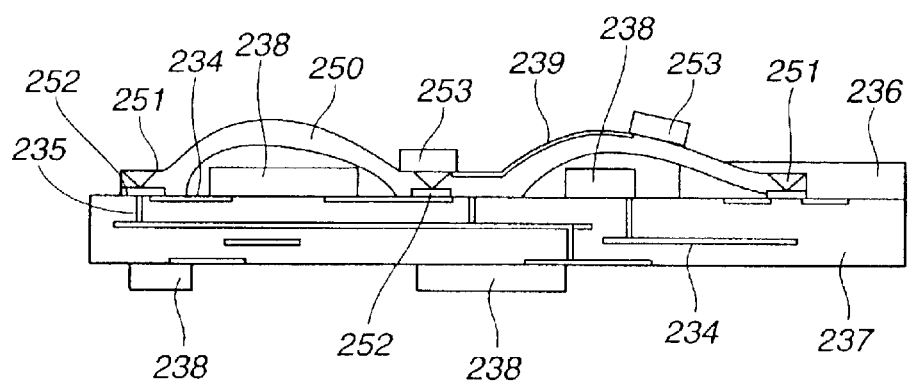
FIG. 17 is a cross-sectional view illustrating an embodiment in which the optical waveguide sheet of the eighth embodiment is mounted on an electric circuit.

In the eighth embodiment, the optical waveguide apparatus can be made thin and flexible, so that it can be approximately tightly mounted on LSIs 238 provided on an electric circuit board 237 with an RF circuit 236, electric wires 234 and a via wiring 235 like a flexible printed circuit (FPC), as illustrated in FIG. 17. In such a mounting, an additional wiring can be formed without design alteration of the electric circuit board 237, and EMC can be achieved at relatively low costs. The electric wiring on an optical waveguide apparatus 250 with an optical-path converting unit 251 and an optical device 252 is aligned with and directly flip-chip bonded on the electric wiring 234 in the electric circuit board 237 in a portable equipment. Thus, an opto-electric mixture wiring substrate can be readily constructed.

An electric wiring 239 and an electric device chip 253 can also be mounted on the optical waveguide sheet 250 if necessary. In this case, the optical sheet itself can be an opto-electric mixture wiring substrate.

In the above discussion, the optical waveguide sheet 250 is used as a flexible wiring substrate. However, a core layer having a thickness of about 1 mm can be injection-molded, and the sheet can be used as a rigid substrate.

Figure 18:
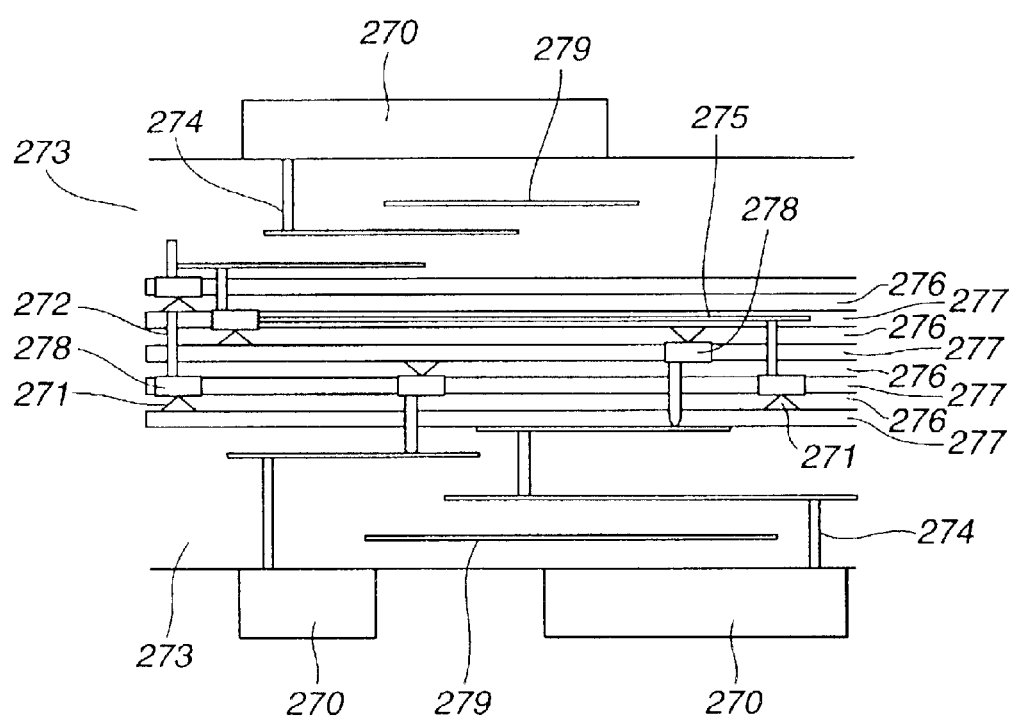
FIG. 18 is a cross-sectional view illustrating a ninth embodiment of an opto-electric mixture wiring apparatus according to the present invention.

FIG. 18 illustrates a ninth embodiment having a multi layer structure. In the multi-layer structure, a simultaneous optical wiring of multiple bits is possible.

As illustrated in FIG. 18, a via wiring 274 and an electric wiring 279 are formed in a multi layer electric circuit board 273, and LSIs 270 are mounted on the surface of the board 273.

In the ninth embodiment, the optical waveguide apparatus is sandwiched between the electric circuit boards 273. The optical waveguide apparatus includes four core layers 276 and five cladding layers 277 which sandwich each core layer 276. An optical-path converting unit 271 and an optical device 278 are provided at locations necessary to construct the optical wiring in each optical waveguide sheet as described in the seventh or eighth embodiment, and these optical sheets are layered to construct the optical waveguide apparatus. A via wiring 272 is formed by forming a via hole in the optical waveguide apparatus and filling the via hole with a plated material or a copper paste, similarly to the electric circuit board 273, in order to drive the optical device 278. The via hole can be simply formed by laser-beam processing, and the hole is formed at a necessary location in each waveguide sheet such that a penetrating hole can be formed when the waveguide sheets are layered with being aligned with each other. Further, an electric wiring 275 can be formed in the cladding layer 277 to construct an in-plane wiring in the optical waveguide apparatus.

In recent build up substrates using only the electric wiring, there exist the following problems in a transmission wiring for high-speed signals. These problems are cross-talk noises due to proximate wiring, signal degradation due to reflections caused by the impedance mismatching, and electromagnetic radiation noises resulting therefrom. Those problems can be solved when the multi layer optical waveguide apparatus of this embodiment with the build-up substrate is used for a portion of high speed signal transmission.

In this embodiment, the optical waveguide apparatus is sandwiched by the electric circuit boards 273. However, there can also be provided a structure in which the electric circuit board is mounted on one side of the optical waveguide apparatus, or a structure in which optical waveguide apparatuses and electric circuit boards are alternately stacked.

In most of the above embodiments, light from the light emitting device is propagated in all directions in the two-dimensional slab waveguide sheet by the optical path converting unit of a conical mirror, for example. In a tenth embodiment, light is propagated in a predetermined direction by a 45-degree mirror to perform one-to-one transmission. In this embodiment, when the light source is a surface emitting laser having a high directivity (its emission angle is less than ten (10) degrees), transmission can be attained toward a predetermined photo detector in a circuit board with an ordinary size (about 10 cm) even using the two-dimensional slab waveguide sheet. Also in a light receiving device, only light propagated from a predetermined direction can be received using the 45-degree mirror.

In the tenth embodiment, the following construction is possible. Light propagating in all directions and light propagating in a predetermined direction exist in a mixed manner, and the photo detector discriminates, separates and detects the propagated light based on its optical power, receiving timing, and the like. Specifically, optical power loss is small when light is propagated in a predetermined direction, so that the power reaching the photo detector in this case is larger than the case where light is propagated in all directions in the optical sheet. Using this characteristic, the photo-detector can discriminate and separate propagating light. Further, where transmission with the directivity is performed, optical power reaching the photo-detector varies depending on the transmission distance. Accordingly, the photo-detector can discriminate and separate signals based on the location of the light transmission source.

Figure 19:
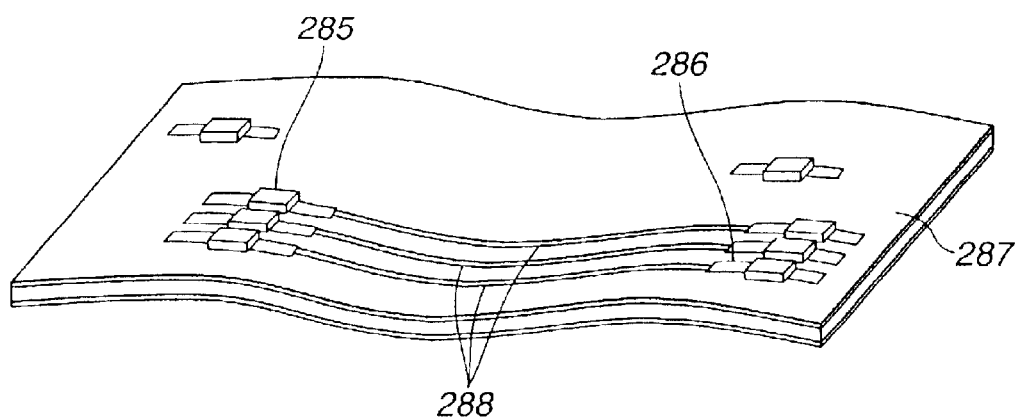
FIG. 19 is a perspective view illustrating an eleventh embodiment of an optical waveguide sheet with line waveguides formed therein according to the present invention.

An eleventh embodiment relates to an optical waveguide sheet 287 which includes line waveguide 288 with a laterally confining structure, as well as the two-dimensional slab waveguide, as illustrated in FIG. 19. The one-to-one transmission can be effectively performed using the line waveguide 288. Predetermined lines between optical devices 285 and 286 are established by the line waveguides 288, respectively. Light confined in the line waveguide 288 does spread over the optical sheet 287. When the light emitting device inputs light into the line waveguides 288, the optical-path converting unit of the light emitting device is preferably the 45-degree mirror as discussed in the fourth embodiment. However, the optical-path converting unit for spreading light over the optical sheet as described in the seventh and eighth embodiments can also be used though only a portion of the light enters the line waveguide 288.

In this embodiment, signal transmission can also be performed between the light emitting device and the light receiving device through the two-dimensional slab waveguide. At this time, there is a possibility that the light propagating in the two-dimensional slab waveguide causes a cross talk with the light propagating along the line waveguide 288. The power level of light leaking into the line waveguide 288 is low, so that the photo-detector can separate and detect the light propagating along the line waveguide 288 between the optical devices 285 and 286.

The line waveguide 288 can be formed as follows, for example. In the case of polycarbonate Z, monochlorobenzene mixed with monomer is coated, and the coated material is then exposed to radiation through a photo-mask having the pattern as illustrated in FIG. 19. Polymerization occurs only in the exposed region, and the refractive index increases only in a polymerized portion to form the line waveguide 288.

The line waveguide 288 can also be formed by a method in which a mold is pressed against the heated optical waveguide sheet 287 to form a protruded line of the line waveguide 288. This embodiment can be preferably employed when parallel transmission is needed.

As described in the foregoing, in the optical waveguide apparatus of the present invention used to solve the electromagnetic noise problem and the like, the optical device can be readily aligned and mounted on the optical waveguide sheet.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. An optical waveguide apparatus comprising:
   an optical waveguide sheet; and
   an optical device, said optical device being provided on said optical waveguide sheet, and including an optical-path converting means for optically coupling said optical device to said optical waveguide sheet,
   wherein both electrodes of said optical device are drawn out on a side opposite to a side on which said optical-path converting means is integrated with said optical device.

2. An optical waveguide apparatus comprising:
   an optical waveguide sheet; and
   an optical device, said optical device being provided on said optical waveguide sheet, and including an optical-path converting means for optically coupling said optical device to said optical waveguide sheet,
   wherein said optical waveguide sheet includes a metal pattern for electric wiring.

3. An optical waveguide apparatus comprising:
   an optical waveguide sheet; and
   an optical device, said optical device being provided on said optical waveguide sheet, and said optical waveguide sheet, or a layer on said optical waveguide sheet including a guide means for mounting said optical device,
   wherein said optical waveguide sheet includes an optical-path converting means immediately below said guide means.

4. An optical waveguide apparatus comprising:
   an optical waveguide sheet; and
   an optical device, said optical device being provided on said optical waveguide sheet, and said optical waveguide sheet, or a layer on said optical waveguide sheet including a guide means for mounting said optical device,
   wherein said guide means is a guide hole for guiding and fixing an electric device therein such that an electric circuit is constructed on said optical waveguide sheet.

5. An optical waveguide apparatus comprising:
   an optical waveguide sheet; and
   an optical device, said optical device being provided on said optical waveguide sheet, and said optical waveguide sheet, or a layer on said optical waveguide sheet including a guide means for mounting said optical device, wherein a metal pattern for driving said optical device, or a metal pattern for electric wiring is formed on said optical waveguide sheet.

6. The optical waveguide apparatus of claim 5, wherein an end of said metal pattern extends into said guide means such that an electrode or a terminal of said optical device can be electrically connected to the end of said metal pattern when said optical device is mounted in said guide means.

* * * * *

UNITED STATES PATENT AND TRADEMARK OFFICE
CERTIFICATE OF CORRECTION

PATENT NO. : 6,829,398 B2
DATED : December 7, 2004
INVENTOR(S) : Toshihiko Ouchi It is certified that error appears in the above-identified patent and that said Letters Patent is hereby corrected as shown below:

Column 1,
Lines 10 and 14, "form" should read -- from --.

Column 2,
Line 1, "optical path" should read -- optical-path --; and
Line 57, "two dimensional" should read -- two-dimensional --.

Column 3,
Line 23, "optical path" should read -- optical-path --, and "45 degree" should read -- 45-degree --; and
Line 34, "optical path" should read -- optical-path --.

Column 4,
Line 56, "opto" should read -- opto- --.

Column 5,
Line 4, "optical path" should read -- optical-path --, and "flatly" should read -- flatly- --;
Lines 18, 20, 64 and 65, "optical path" should read -- optical-path --; and
Line 44, "45 degree" should read -- 45-degree --.

Column 6,
Line 1, "spin coating" should read -- spin-coating, --;
Lines 7, 14, 24 and 32, "optical path" should read -- optical-path --; and
Line 54, "parallel serial" should read -- parallel-serial --.

Column 7,
Line 42, "optical path" should read -- optical-path --.

Column 8,
Lines 22 and 62, "cross sectional" should read -- cross-sectional --.

Column 11,
Line 65, "bare chip" should read -- bare-chip --, and "above discussed" should read -- above-discussed --.

Column 12,
Line 18, "opto electric" should read -- opto-electric --;
Line 43, "vacuum evaporated" should read -- vacuum-evaporated --; and
Line 55, "FIGS. 5B," should read -- FIGS. 6B, --.

UNITED STATES PATENT AND TRADEMARK OFFICE
CERTIFICATE OF CORRECTION

PATENT NO.    : 6,829,398 B2
DATED         : December 7, 2004
INVENTOR(S)   : Toshihiko Ouchi It is certified that error appears in the above-identified patent and that said Letters Patent is hereby corrected as shown below:

Column 13,
Lines 37 and 57, "45 degree" should read -- 45-degree --; and
Lines 45 and 51, "optical path" should read -- optical-path --.

Column 14,
Line 12, "laterally" should read -- laterally --; and
Line 20, "45 degree" should read -- 45-degree --.

Column 15,
Line 9, "half mirror" should read -- half-mirror --;
Line 49, "has" should read -- have --; and
Line 50, "optical path" should read -- optical-path --.

Column 16,
Line 24, "self" should read -- self --;
Line 26, "extends" should read -- extend --;
Line 62, "An" should read -- A --; and
Line 63, "light absorbing" should read -- light-absorbing --.

Column 17,
Lines 1 and 44, "optical path" should read -- optical-path --;
Line 51, "one" should read -- one --; and
Line 66, "photo detector" should read -- photo-detector --.

Column 18,
Line 3, "opto electric" should read -- opto-electric --; and
Line 64, "common mode" should read -- common-mode --.

Column 19,
Line 32, "optical path" should read -- optical-path --.

Column 20,
Line 33, "multi" should read -- multi- --;
Lines 37 and 67, "multi layer" should read -- multi-layer --;
Line 56, "with" should read -- while --;
Line 60, "build up" should read -- build-up --; and

UNITED STATES PATENT AND TRADEMARK OFFICE
CERTIFICATE OF CORRECTION

PATENT NO. : 6,829,398 B2
DATED : December 7, 2004
INVENTOR(S) : Toshihiko Ouchi It is certified that error appears in the above-identified patent and that said Letters Patent is hereby corrected as shown below:

Column 21,
Line 12, "optical path" should read -- optical-path --;
Lines 19, 26 and 30, "photo detector" should read -- photo-detector --;
Line 40, "laterally" should read -- laterally- --; and
Line 59, "cross talk" should read -- cross-talk --.

Signed and Sealed this

Twenty-fourth Day of May, 2005

JON W. DUDAS
*Director of the United States Patent and Trademark Office*